US012561285B1

(12) United States Patent
Ghatage et al.

(10) Patent No.: US 12,561,285 B1
(45) Date of Patent: Feb. 24, 2026

(54) SYSTEM AND METHOD FOR EFFICIENT FILE STORAGE AND MANAGEMENT

(71) Applicant: Accenture Global Solutions Limited, Dublin (IE)

(72) Inventors: Prakash Ghatage, Bangalore (IN); Nirav Jagdish Sampat, Mumbai (IN); Richard Stephen Vincent Price, Palatine, IL (US); Naveen Kumar Kumar Thangaraj, Salem (IN); Sattish Sundarakrishnan, Bangalore (IN); Prabhat Kumar Singh, Bangalore (IN); Mahesh Kumar Bindiganavile Krishnegowda, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/810,330

(22) Filed: Aug. 20, 2024

(51) Int. Cl.
*G06F 16/00* (2019.01)
*G06F 16/13* (2019.01)
*G06F 16/172* (2019.01)

(52) U.S. Cl.
CPC ............ *G06F 16/172* (2019.01); *G06F 16/13* (2019.01)

(58) Field of Classification Search
None
See application file for complete search history.

(56) References Cited

U.S. PATENT DOCUMENTS

| | | | | | |
|---|---|---|---|---|---|
| 5,956,752 | A | * | 9/1999 | Mathews | ............ G06F 12/0862 711/204 |
| 6,138,209 | A | * | 10/2000 | Krolak | ................ G06F 12/0864 711/204 |
| 7,002,700 | B1 | * | 2/2006 | Motamed | ........... H04N 1/00474 358/1.18 |
| 9,374,559 | B1 | * | 6/2016 | Beguin | .............. H04N 21/2347 |
| 11,086,545 | B1 | | 8/2021 | Dayal et al. | |
| 2006/0184741 | A1 | * | 8/2006 | Hrusecky | ............ G06F 12/0842 711/E12.039 |
| 2008/0318610 | A1 | * | 12/2008 | Bhaskaran | .......... H04L 65/4061 455/518 |

(Continued)

FOREIGN PATENT DOCUMENTS

CN 113419976 A * 9/2021 ......... G06F 18/2431

OTHER PUBLICATIONS

Nag, Somenath, "How AI is Reshaping Storage Technologies," Calsoft Technology First Blog, Jun. 21, 2024, 4 pages. [retrieved from: https://www.calsoftinc.com/blogs/how-ai-is-reshaping-storage-technologies.html#:~:text=Businesses%20rely%20on%20advanced%20technologies,of%20these%20are%20formidable%20challenges].

*Primary Examiner* — Hasanul Mobin

(74) *Attorney, Agent, or Firm* — Mannava & Kang, P.C.

(57) ABSTRACT

The present disclosure discloses the system and method for efficient file storage and management. The method includes collecting information on access of different files by different applications on a master storage. The collected information is then normalized within a predetermined range. Additionally, the method includes training a machine learning model with the normalized information to predict which of the files should be stored in a cache. The cache is ten implemented by storing predicted files in the cache. Consequently, the different applications then access one of the predicted files in the cache without making multiple copies of the predicted files.

11 Claims, 5 Drawing Sheets

(56)  References Cited

U.S. PATENT DOCUMENTS

| | | | | |
|---|---|---|---|---|
| 2018/0373722 | A1* | 12/2018 | Ulasen | G06N 3/044 |
| 2022/0043752 | A1* | 2/2022 | Hua | G06N 20/00 |
| 2022/0350484 | A1* | 11/2022 | Vankamamidi | G06F 12/126 |
| 2024/0046144 | A1* | 2/2024 | Ohm | G06F 16/2465 |
| 2024/0111812 | A1 | 4/2024 | Canessa et al. | |
| 2024/0143276 | A1* | 5/2024 | Goryavskiy | G06F 16/2272 |

\* cited by examiner

300

Data Or File Accesses — 302

Preprocess Data — 304

Train Neural Network — 306

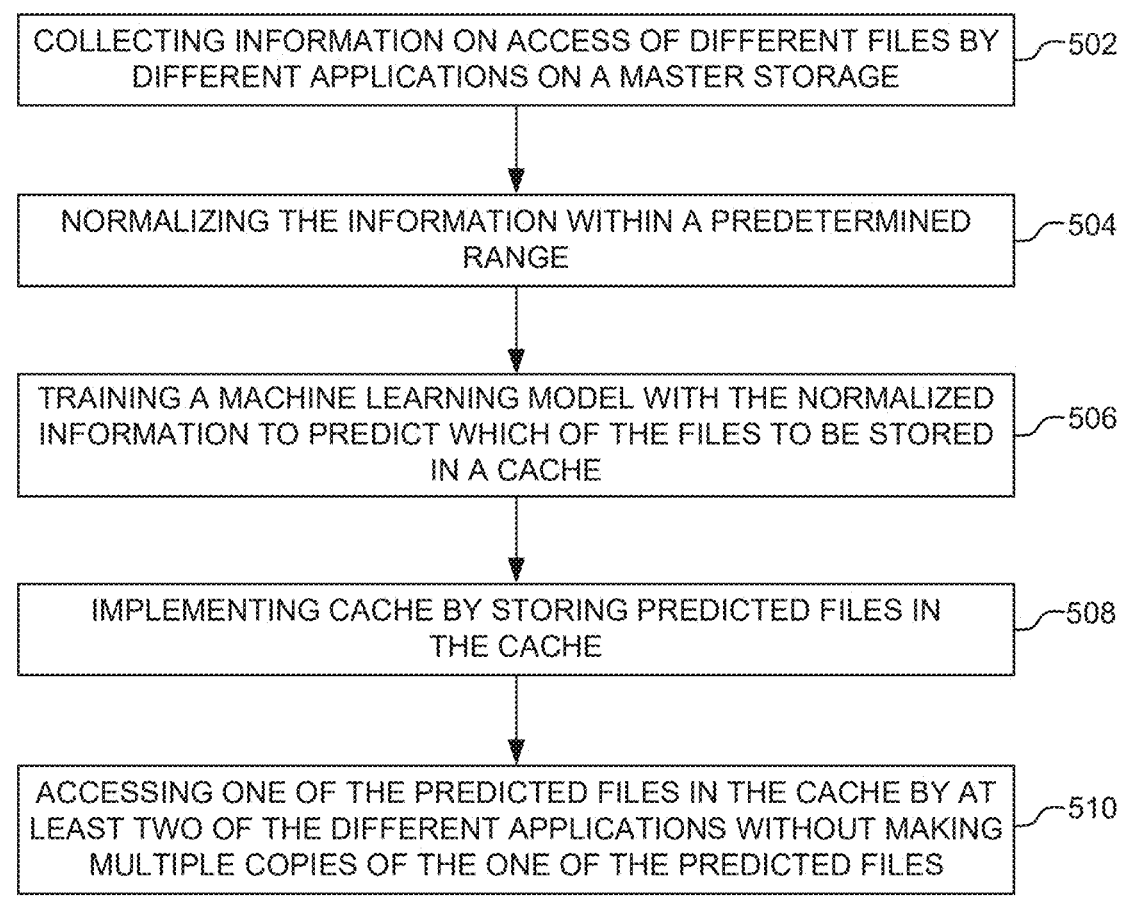

500

COLLECTING INFORMATION ON ACCESS OF DIFFERENT FILES BY DIFFERENT APPLICATIONS ON A MASTER STORAGE — 502

NORMALIZING THE INFORMATION WITHIN A PREDETERMINED RANGE — 504

TRAINING A MACHINE LEARNING MODEL WITH THE NORMALIZED INFORMATION TO PREDICT WHICH OF THE FILES TO BE STORED IN A CACHE — 506

IMPLEMENTING CACHE BY STORING PREDICTED FILES IN THE CACHE — 508

ACCESSING ONE OF THE PREDICTED FILES IN THE CACHE BY AT LEAST TWO OF THE DIFFERENT APPLICATIONS WITHOUT MAKING MULTIPLE COPIES OF THE ONE OF THE PREDICTED FILES — 510

FIG. 5

SYSTEM AND METHOD FOR EFFICIENT FILE STORAGE AND MANAGEMENT

FIELD

Various embodiments described herein relate generally to the field of file storage technologies, and in particular, to a method and a system for efficient storage and management.

BACKGROUND

With the rapid development of computer technology and internet technology, the demand of users for high-performance storage is increasing. Moreover, several applications run parallelly that access same document at same time to create multiple redundant copies of the document by saving it at different storage locations. Having duplicate copies of files consumes unnecessary storage space. This inefficiency results in larger spreadsheets, increased memory usage, and longer read/write operations. Further, managing redundant data becomes more cumbersome. Updates or changes need to be applied consistently across all versions, which at times are error-prone, time-consuming as well as confusing. With ever increasing data usage, the demand of huge computer resources for read/write operations from master storage and redundancy in local deployment is increasing day by day. In short, data duplication wastes resources, complicates maintenance, and risks inconsistencies.

SUMMARY

Implementations of the present disclosure are generally directed to file storage technologies, for efficient storage and management of data. In particular, the present disclosure relates to computer resource optimization and reduce latency.

As a particular example, a method is disclosed for collecting information on access of different files by different applications on a master storage, normalizing the information within a predetermined range, training a machine learning model with the normalized information to predict which of the files should be stored in a cloud located cache, implementing the cache by storing predicted files in the cache, and accessing one of the predicted files in the cache by at least two of the different applications without making multiple copies of the one of the predicted files.

The present disclosure further describes a system for implementing the method provided herein. The present disclosure also describes a non-transitory computer readable media coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure is not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

Various embodiments in accordance with the present disclosure will be described with reference to the drawings, in which:

FIG. 5 is a flow diagram that presents an example method for accessing files in accordance with implementations of the present disclosure.

Like reference numbers and designations in the various drawings indicate like elements.

DETAILED DESCRIPTION

Figure 1:
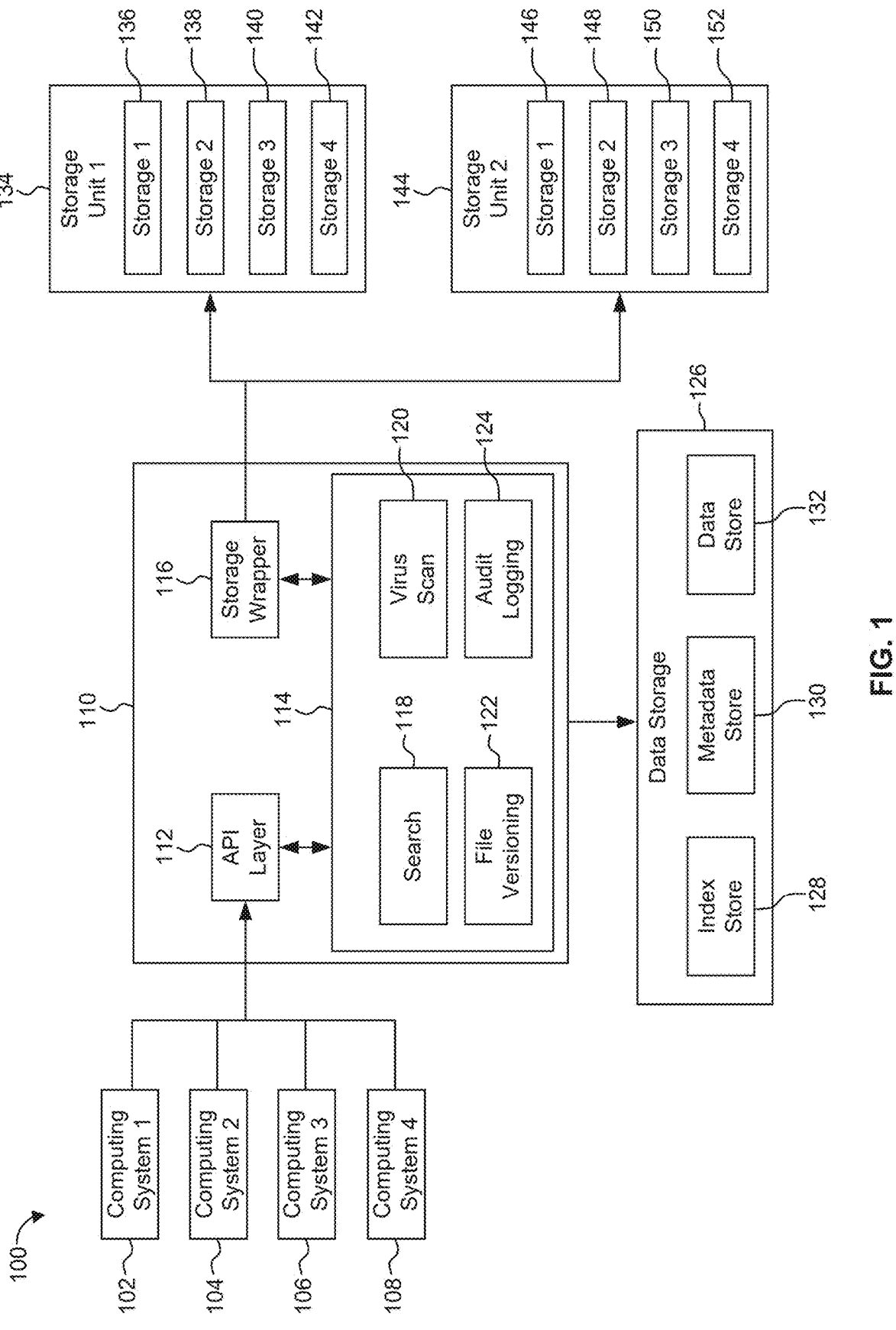
FIG. 1 illustrates an environment of a system in accordance with some implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example", "an example of", "by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

The term "about" when used in connection with a numerical value means a variation consistent with the range of error in equipment used to measure the values, for which ±5% may be expected. Non-numerical uses of "about" carry similar variation.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

As a particular example, a method for collecting information on access of different files by different applications on a master storage; normalizing the information within a predetermined range; training a machine learning model with the normalized information to predict which of the files should be stored in a cloud located cache; implementing the cache by storing predicted files in the cache; and accessing one of the predicted files in the cache by at least two of the different applications without making multiple copies of the one of the predicted files.

In yet another example, the implementing comprises predicting, using the machine learning model, that a particular one of the files is to be cached; and storing the particular one of the files on the cache. The accessing comprises: instructing the different applications to access the cache for the predicted files rather than the master storage. The accessing comprises simultaneously accessing a predicted file in the cache by at least two of the different applications without making multiple copies of the file. The method also comprises updating the cache with updated versions of the predicted files. The information of each of the files include name, size, access time, and frequency of access. The information of each of the files include any of: whether a user or application called the file; what application is calling the file; what geographic region a call for a file is originating from; success or failure to download the file; and what is query to used execute data of the file.

As a particular example, a non-transitory computer readable media storing instructions programmed to cooperate with an electronic computer system to cause the system to perform operations, comprising: collecting information on access of different files by different applications on a master storage; normalizing the information within a predetermined range; training a machine learning model with the normalized information to predict which of the files should be stored in a cloud located cache; implementing the cache by storing predicted files in the cache; and accessing one of the predicted files in the cache by at least two of the different applications without making multiple copies of the one of the predicted files.

In yet another example, the implementing comprises: predicting, using the machine learning model, that a particular one of the files is to be cached; and storing the particular one of the files on the cache. The accessing comprises: instructing the different applications to access the cache for the predicted files rather than the master storage. The accessing comprises simultaneously accessing the predicted file in the cache by at least two of the different applications without making multiple copies of the file. Updating the cache with updated versions of the predicted files. The information of each of the files include name, size, access time, and frequency of access. The information of each of the files includes any of whether a user or application called the file; what application is calling the file; what geographic region a call for a file is originating from; success or failure to download the file; and what is query to used execute data of the file.

As a particular example, a system, comprising: a non-transitory computer readable memory storing instructions; a processor programmed to cooperate with the instructions in memory to perform operations comprising: collecting information on access of different files by different applications on a master storage; normalizing the information within a predetermined range;

training a machine learning model with the normalized information to predict which of the files should be stored in a cloud located cache; implementing the cache by storing predicted files in the cache; and accessing one of the predicted files in the cache by at least two of the different applications without making multiple copies of the one of the predicted files.

In yet another example, the implementing comprises: predicting, using the machine learning model, that a particular one of the files is to be cached; and storing the particular one of the files on the cache. The accessing comprises: instructing the different applications to access the cache for the predicted files rather than the master storage. The accessing comprises simultaneously accessing the predicted file in the cache by at least two of the different applications without making multiple copies of the file. Updating the cache with updated versions of the predicted files. The information of each of the files including name, size, access time, and frequency of access.

Multiple applications require file storage to store files (interchangeably referred to as documents) as part of the business process, for example but not limited to invoices, data tables, spreadsheets, journal entries, supporting documents and so on. These files often contain highly confidential client data which are in different formats. Accordingly, these files must be securely stored, sometimes for months which can last long to several years to maintain records and audits. The stored files are required to be scanned for virus and malware protection. In the existing art, server based antivirus scanners are used but these are not feasible for Kubernetes deployments. In such case, different departments need to employ different solutions, which are generally inadequate. In addition to above, the file streaming is required to handle large file sizes and repeated storage of such huge files in database is a tedious task. Moreover, every file is not in the format to perform search on it rather only metadata can be searched. To make the search enable, redundant files to these files are stored at various locations in the client storage systems. Thus, there is demand for huge computer resources for read/write operations from master storage and redundancy in local deployment. In other words, data duplication wastes resources, complicates maintenance, and risks inconsistencies.

In an exemplary representation, a general file storage system is disclosed herein. A file scan center receives a hard copy of a document for scanning. The scanned hard copy is uploaded from system A to an email. From system A, the scanned copy is provided to system B that saves a copy of the scanned document. Another copy of the scanned document is given to system C and one more copy of the scanned document is provided to system D. So, every system has a copy of same document and try to enhance the same copy of the scanned document separately at each system A, B, C and D. For example, the system B processes the scanned copy received through the email at the system B to breakdown the scanned copy in page-by-page format. The page-by-page format scanned copy is provided to system C. The system C digitally sign the page-by-page format scanned copy and stores the digitally signed copy in system C. The system C further provide the digitally signed copy to system D. Thus, the storage keeps on increasing those results in wastage of computer resources.

To overcome the above challenges, implementation of the present disclosure generally relates to optimizing computer resources by avoiding storage of multiple versions of the file.

Specifically, the present disclosure is directed to avoid creating and storing redundant files in master storage by creating a local copy in cache of documents which may be used multiple times by multiple applications. The overall system may be designed in a way that rather than sending the original file, a reference of that file may be send. So, a user may access the document from cache to perform operations by accessing the reference (for example a hyperlink may be created) directly to perform different tasks.

According to implementations of embodiments of the present disclosure, applications for accessing the file may be, for example, an artificial intelligence application, a machine learning application, a big data analytics applications, and many other types of applications. Therefore, to access same file using different applications, a reference of the file is shared with these applications instead of fetching it from the master storage each time and storing it at multiple other storages that waste resources as well as degrades processing speed. Streaming of the documents from the cache uses lower computer resources. Also, reduced storage of redundant copies of the documents across multiple parallel running applications to reduce computer resources regarding storing multiple copies, maintains consistency across applications and are faster to search and update different versions to maintain consistency.

As described above, the storage systems described herein may be configured to support different computing applications. The rapid growth in these applications is being driven by three technologies deep learning (DL), GPU processors, and Big Data. Deep learning is a computing model that makes use of massively parallel neural networks inspired by the human brain. Instead of experts handcrafting software, a deep learning model writes its own software by learning from lots of examples. The neural networks can be used for data or file caching by training them to predict which data or files may be accessed in the future. The neural networks can learn complex patterns and correlations from the data, which can make them effective in predicting future data or file accesses.

Therefore, the present disclosure discloses that the carefully designed neural network architecture ensures that the model is effective and efficient. The model is designed in a way that the file is read from the cache, thereby using lower computing resources and lacks in storing multiple copies of the files at different applications. The reduced computer resources may be achieved as per the implemented disclosure due to the model lacking to store multiple copies of the files, maintains consistency across applications and allows faster search and retrieval of the files. Instead of sending original file, a reference of the file can be sent that may be accessed programmatically. The user can open the file in the required format as well as edit and save the file in the smart cache rather than streaming from the master memory each time. Moreover, the disclosed ML model effectively utilize the storage resources and improves the storage space utilization rate and the storage hit rate. Redundant data blocks with the same files and copies of files in different versions and formats accessed for different applications are avoided by storing a local copy in the cache. This improves the storage utilization rate, enlarge the mapping quantity of the cache data blocks, improves the cache system hit rate and reduces the access to the lower storage device.

FIG. 1 illustrates an environment of a system in accordance with some implementations of the present disclosure. System 100 includes numerous elements for purposes of illustration rather than limitation. It may be noted that system 100 may include the same, more, or fewer elements configured in the same or different manner in other implementations.

System 100 includes several computing devices 102-108. The computing devices 102-108 may be embodied, for example, desktop computing devices, smartphones, laptops, tablet, voice-enabled devices, a workstation, a personal computer, a notebook, and/or the like. In some examples, the computing devices 102-108 are used by respective users 402 (disclosed in FIG. 4) to log into and interact with computing platforms executing applications according to implementations of the present disclosure. The network connects websites, the computing devices 102-108, and the back-end systems like data storage 126, storage units 134 and/or 144 (data storage 126 and storage units 134 144 may interchangeably be referred to as back-end systems). The storage unit 134 may further include neural cache arrays 136 to 142, for example, which may for simplicity be represented as storage 1, storage 2, storage 3 and storage 4. The storage units 144 may further include neural cache arrays 146 to 152, for example, which may for simplicity be represented as storage 1, storage 2, storage 3 and storage 4. The computing devices 102-108 may have several computing applications installed on the computing devices to perform various functions. These applications interact with the system 100 components using an API layer 112. The API layer 112 acts as a bridge between the applications in computing devices and underlying system 100. The primary function of the API layer 112 may be to provide an interface for API calls and requests. By seamlessly integrating, communicating, and sharing data and functionalities via APIs, the API layer enables efficient interaction between the applications in computing devices 102-108 and the storage units 134, 144.

In some examples, a network that supports interaction/communication between the computing devices and other components of the system 100, may include but not limited to a Local Area Network (LAN), a Wide Area Network (WAN), Internet, or a combination thereof. In some examples, the network of the system 100 may be accessed over a wired and/or a wireless communication link. For example, a computing device like smartphone may utilize a cellular network to access the network 108.

In some examples, one or more of the back-end systems 126, 134, 144 may be implemented as an on-premises system that is operated by an enterprise or a third-party engaged in cross-platform interactions and data management. In some examples, the back-end systems 126, 134, 144 may be implemented as an off-premises system (for example, cloud or on-demand) that is operated by an enterprise or a third-party on behalf of an enterprise. In some examples, the back-end systems 126, 134, 144 may be implemented in a cloud environment. For simplicity, the back-end systems 134 and 144 depicted in FIG. 1 may be a cloud environment that is intended to represent various forms of servers including a web server, an application server, a proxy server, a network server, a server pool, and/or the like. The storage unit 1, 134 may further disclose various storages, for example but not limited to SharePoint, Documentum, AWS S3, Dropbox and so on. The storage unit 2, 144 may further disclose various storages, for example but not limited to SharePoint, Azure Blobs, GCP Buckets, File System and so on. Further, the back-end system 126, which may be exemplary illustrated as data storage 126, may be a centralized storage system or master storage that manages and stores data for applications, websites, or services. For example—the data storage 126 can be a central database that is capable of storing indexes, metadata (json or xml) and/or data in relational form. The data storage 126 may further include an index store 128, a metadata 130 and a data store 132. The index store 128 (interchangeably referred to as index structure) stores (key, value) pairs or particulars, sometimes referred to as a dictionary/map/items. The primary function of the index store is to efficiently access a given record based on a particular field. Accordingly, instead of scanning through the entire collection, the index store 128 searches the desired record in the index. The metadata 130 includes attributes like file creation time, file type, size, modification history and so on. Such details help to manage and organize data effectively. The data store 132 is a temporary storage in the data storage 126.

In some examples, each of the back-end systems 126, 134 and 144 are coupled to one or more processors 114. The processor 114 may host components of enterprise systems and applications. Also, the processor 114 accepts requests from the computing devices 102-108 for services being provided by the enterprise systems and the applications. In response to the accepted requests, the processor 114 provides the requested services to the computing devices 102-108 over the network. The requests received from the computing devices 102-108 may be text prompts. The text prompts may be used as a mode of interaction with a Machine Learning (ML) system or a neural network. In some examples, the GAI system may be implemented by the enterprise systems for generating responses/outputs for the text prompts or for performing one or more specified tasks in response to the text prompts. Examples of the tasks may include question-answers, data analysis, searching from the database and/or the like.

The processor 114 provide services for the back-end systems 126, 134, 144, that may include multiple components but are not limited to a search block 118, a file versioning block 122, a virus scan block 120, an audit logging block 124 and so on. The search block 118 searches a file requested by the computing devices. The virus scan block 120 scans all input files received from the computing system 1, computing system 2, computing system 3 and computing system 4, 102-108 for any risks or viruses before storing the received file into the backend systems. The file versioning block 122 stores different versions of files that are made over the time due to changes in the file or the formats of the file. The audit logging block 124 systematically record events, actions, and changes within a computer system, network, application, or database. These recorded events are stored in a structured and chronologically ordered format within files or databases known as audit logs. The audit logs may contain one or more of timestamp, event description and tags, users and entities, action types of data access details, error information, transaction details, and so on. The processor 114 may be coupled to a storage wrapper 116. The storage wrapper 116 simplify the usage of complex or low-level functionality by offering a higher-level, user-friendly interface. They abstract away underlying complexity, providing consistent methods or classes that developers can easily understand and utilize. The API layer 112, the processor 114, the storage wrapper 116 and may include further components that together discloses neural network based data storage 110.

Figure 2:
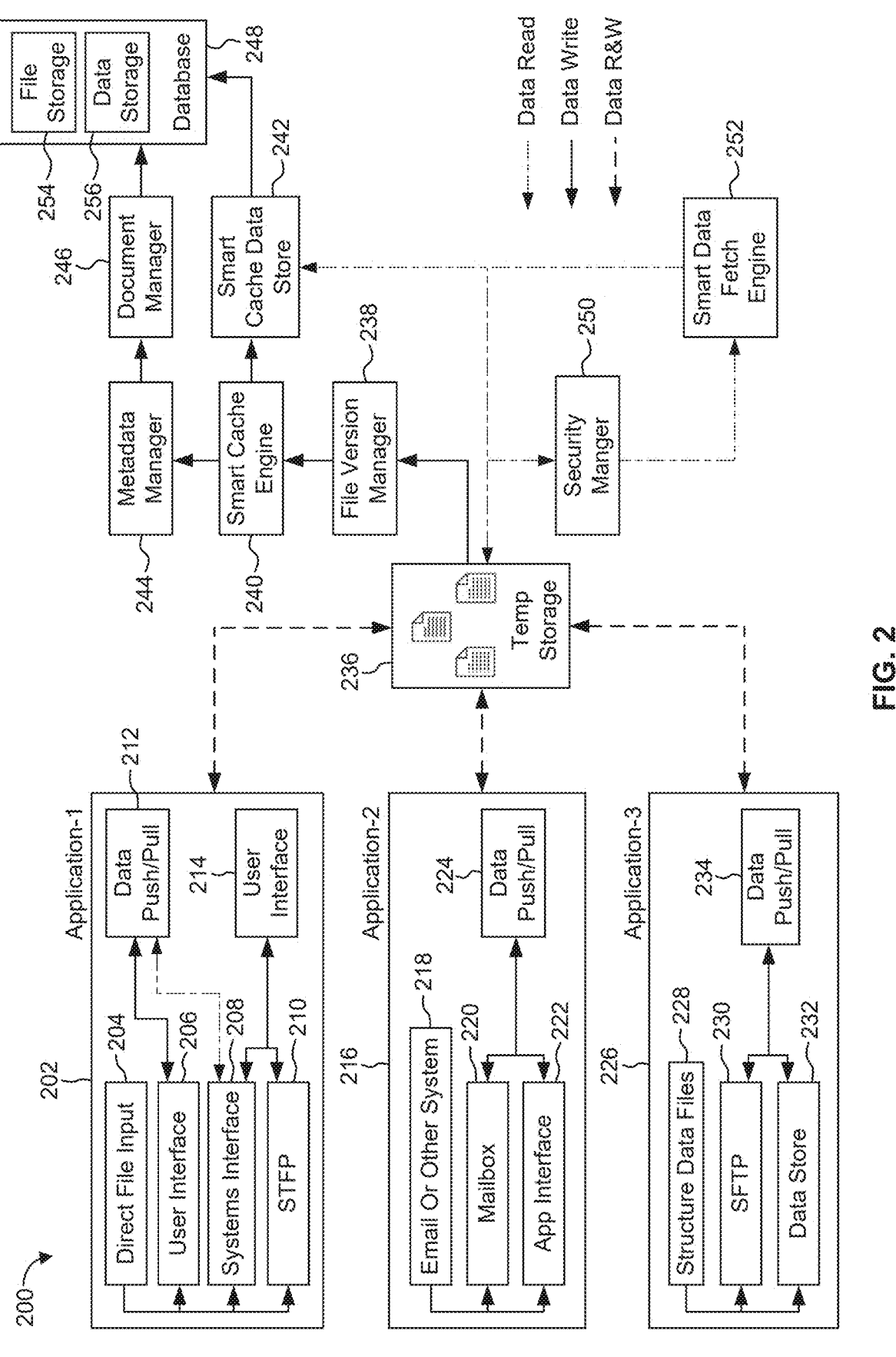
FIG. 2 illustrates an exemplary logical flow diagram for file storage in accordance with implementations of the present disclosure.

FIG. 2 illustrates an exemplary logical flow diagram for file storage in accordance with implementations of the present disclosure. The flow diagram 200 discloses three computing systems 202, 216 and 226. The first computing system 202 may disclose an application software, installed on the first computing system 202 as application 1. The first computing system 202 may receive direct file input 204 from a user interface 206, a system interface 208 and so on. The application 1 may control a user interface 214, the system interface 208 and communicate using STFP protocol 210 based on the instructions entered in the first computing system by a user through the user interface 214 for application 1. The flow diagram 200 further discloses the second computing system 216 that may receive a file through an email or from other system 218. The file may be received in the mailbox 220 and accessed using application interface 222. The second computing system 216 may be loaded with an application 2 that is communicatively coupled to the mailbox 220 and the application interface 222. The third computing system 226 may further disclose an application 3. The third computing system 226 may have a structured data file 228 that may be presented in a data store 232 and may be transferred using SFTP protocol 230. The STFP protocol and the data store may be controlled using application 3 in the computing system 234. Push/Pull blocks 212, 224 and 234 in the computing systems disclosed above may transfer data between components of respective applications and back-end systems.

The three computing systems 202, 216 and 226 may receive, for simplicity, let's consider three respective files through different applications that may have different storage formats. The three different files from the applications installed on the computing systems 212, 216 and 226 may be initially stored in a temp storage 236. The files temporarily stored in the temp storage 236 may be read using a security manager 250. On ensuring the security of the files stored in the temp storage 236, the file may be transferred to a database or in other words, the file may be written in the database 248 (interchangeably referred to as master storage). The master storage further includes different file storages, for example—Azure Blob Storage etc. The different storages may be file storage 254 and data storage 256 in the master storage, such as database 248. For reading files from the database/a smart cache data store 248, 242, a smart data fetch engine 252 based on the user request, fetches files from the database/a smart cache data store 248, 242 and handover them to the respective computing system for further processing.

As illustrated in FIG. 2, the logical flow diagram discloses storage of files that includes a smart cache engine 240 and a smart cache data store 242. The smart cache data store 242 may be responsible for faster document retrieval. The smart cache engine 240 may keep track of the frequency at which the file is accessed and required rotationally. Based on the regular retrieval of the file, for example, if the file is required to be accessed in the system after 24 hours, the file may be fetched from the database 248, and saved in the smart cache data store 242 in advance for faster access locally. The smart cache engine 240, collects props about the file on the basis of historical events to prepare indexer, preprocess the collected data to determine access frequency and train the machine learning model (interchangeably referred to as ML model) to perform the operations as disclosed in the present disclosure. The indexer may be stored in the metadata manager 244, based on which the document manager 246 manages files in the database 248. When different applications perform operations on the files, a file version manager 238 manages different versions of the files in the smart cache data store 242. Once the operations are performed, the local file in the smart cache data store 242 is updated to latest version and other redundant files may be removed for efficient storage. The ML model may observe the pattern in which the file is stored, the pattern the file is being used, number of times the file is used, saving the file to the smart cache data store 242 and accordingly the smart cache engine 240 may update the files into the smart cache data store 242 to access them easily.

Thus, the logical flow diagram exemplary discloses that the files that may be used multiple times by the system 100 may be determined by a smart cache engine 240 and may be stored locally in the smart cache data store 242. The different applications may access the file locally from the smart cache data store 242 and the versions may be recorded using a file version manager 238. This reduces redundancy and enhance speed of the file retrieval. The ML model therefore results in efficient computer resource utilization and enhances system output with less chances of errors in retrieval of updated version of the files.

Figure 3:
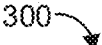
FIG. 3. illustrates an exemplary implementation of an ML model in accordance with implementations of the present disclosure.
Figure 3:
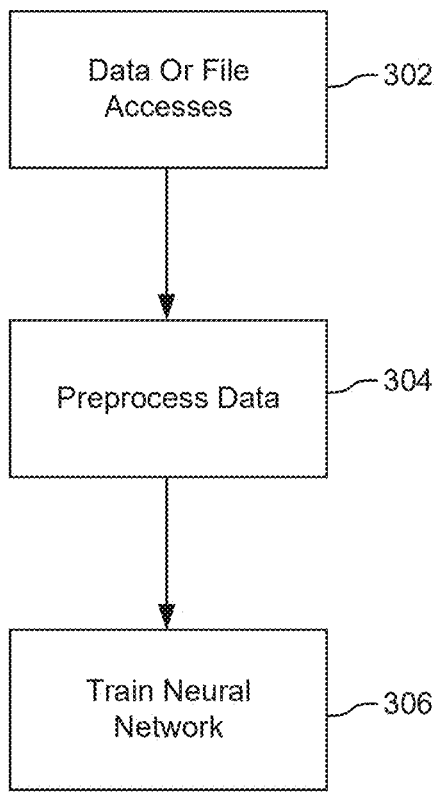

FIG. 3. illustrates an exemplary implementation of an ML model in accordance with implementations of the present disclosure. While implementations of the present disclosure as described in further detail herein with non-limiting reference to the neural networks based model as an example of foundation model, it is contemplated that implementations of the present disclosure may be realized using any appropriate foundation models or Machine Learning (ML) models, or Artificial Intelligence (AI) models. Such models may generate the content/response based on any appropriate modality (for example, text, audio, image, video, and/or the like). In some examples, such models may support communications and interactions, and processes in software systems to support decision-making within an organization.

Multiple applications within a corporate network environment may use and interact with foundation models of the AI/ML systems to provide input and/or data for the execution of a wide variety of tasks, such as, human computer interactions (i.e., question-answer), automating process execution, process planning, generating step-by-step procedures for the process execution, performing data analysis, and/or the like.

The present disclosure further discloses an exemplary implementation of the ML model 300 in accordance with implementations of the present disclosure. As non-transitory computer readable memory storing instructions and a processor programmed to cooperate with the instructions in memory to perform operations. The ML model 300 includes a data or file accesses block 302, a preprocess data block 304 and a train neural network block 306 to perform operations for a system 400. The ML model 300 collects information/data about access of different files by different applications on a master storage/database 248. The collection information may include details regarding but not limited to the information of each of the files including name, size, access time, frequency of access and so on. The preprocess data block 304 discloses that the collected information at block 302 may be normalized within a predetermined range. During the normalization process, the collected information is preprocessed to extract useful features. For example, extract the data or file extension, data or file size, and access frequency of the files. The train neural network block 306 discloses that the normalized information may be used to train the ML model to predict which of the files can be stored in a cache (for example, referred to as Redis cache or neural network based cache or local cache or cache data store or smart data cache store) The cache may be located on any computing device (e.g. virtual machine within an on-premise datacenter or a cloud service, whichever may be suitable) that may allow for faster access of files compared to the underlying large/long term file storage.

After normalization, the ML model 300 may be trained based on different neural network architectures, for example but not limited to architectures such as feedforward neural networks, convolutional neural networks, and recurrent neural networks and so on. The trained ML model may also be tested using a different dataset to evaluate performance of the trained ML model. The cache temporarily stores frequently accessed files in fast storage close to the application. The cache may be transformed into massively parallel compute units or cache arrays 136-142, 146-152, for running inferences for Deep Neural Networks (DNNs). Once the ML model 300 predicts the files which may be stored in the smart cache data store 242, the smart cache data store 242 may be implemented by storing predicted files in the smart cache data store 242. The implementation is based on the prediction of that data or files which are likely to be accessed in the future. The ML model 300 predicts that a particular one of the files is to be cached and store the particular one of the files on the smart cache data store 242. In other words, the trained ML model 300 accesses the information in the smart cache engine 240 to check associated preprocessed information and based on the preprocessed information, such as but not limited to frequency of access of the file or future requirements, fetch the files (may be interchangeably referred to as data tables or documents) locally into the smart cache data store 242. The ML model predicts a particular one of the files to be cached and store the particular one of the files on the smart cache data store 242. The data or file accesses block 302 discloses accessing i.e. to instruct different applications to access the smart cache data store 242 for the predicted files rather than accessing the master storage/database 248. In an example, the different applications in the computing devices 202, 212, and 226 may simultaneously access the predicted file in the smart cache data store 242 by making multiple copies of the file. In another example, the predicted files in the smart cache data store 242 may also be accessed by at least two of the different applications in the computing devices 202, 212, 226, without making multiple copies of the one of the predicted files. The smart cache data store 242 may constantly be monitored by the ML model 300 to determine whether the files are required to be populated or to overwrite the smart cache data store 242 for updating it with new dataset/files/documents. Thus, the smart cache data store 242 is updated with updated versions of the predicted files.

The data or file accesses block 302 discloses accessing the data or files, for example, the computer readable media instructs the different applications to access the cache for the predicted files rather than the master storage. It should be appreciated that caching the file locally results in saving computing resources by saving storage space, enhance performance, reduce latency, and reduce power consumption. The ML models that utilize Neural networks for cache bridges the gap between memory and computation, unlocking impressive performance gain.

Figure 4:
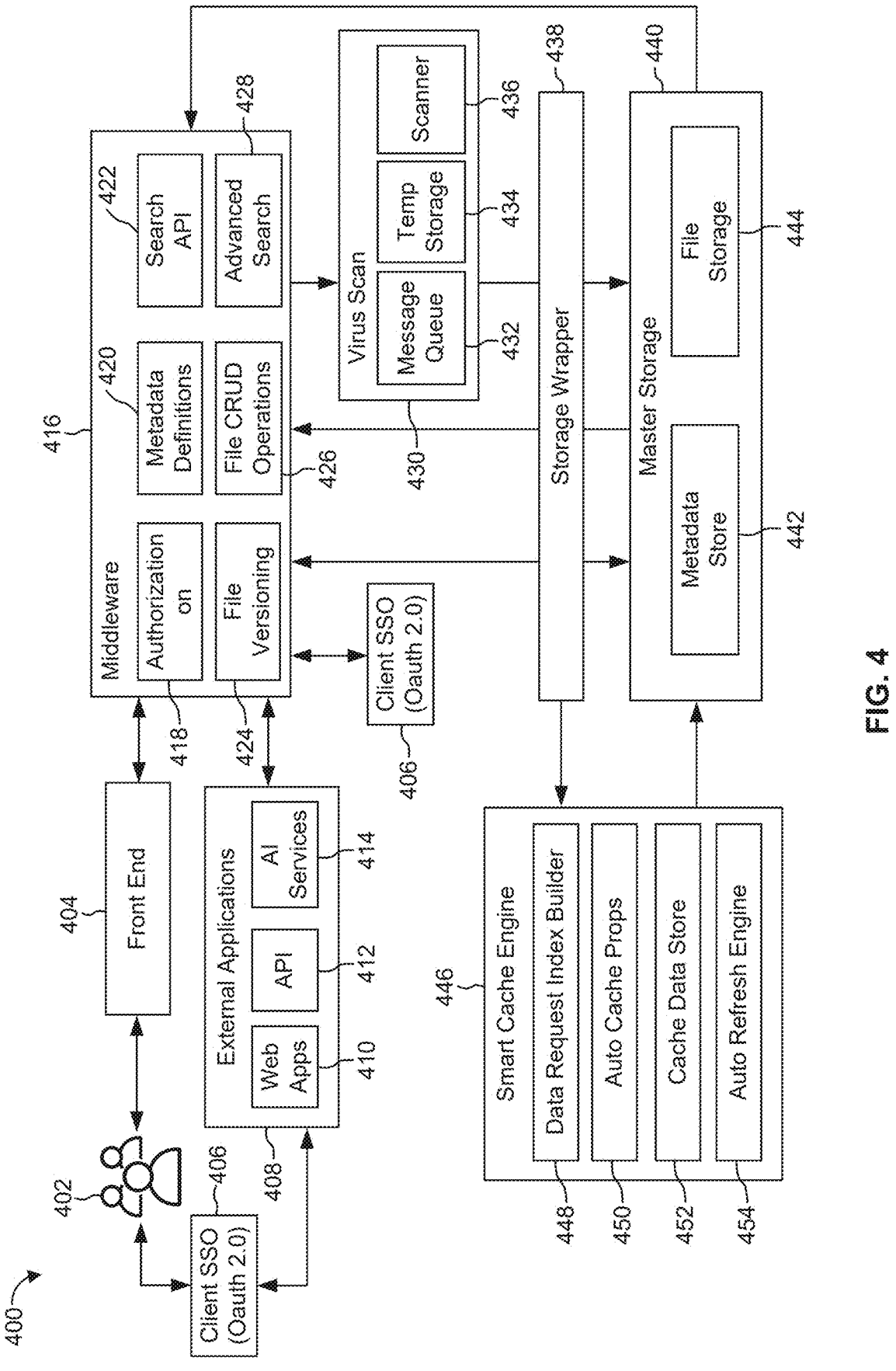
FIG. 4 is a block diagram of a technical architecture of system in accordance with implementations of the present disclosure.

FIG. 4 is a block diagram of a technical architecture of a system 400 in accordance with implementations of the present disclosure. In general, when files are saved in back-end systems, for example but not limited to Share-Point, Documentum, AWS S3, Dropbox, Azure Blobs, GCP Buckets, and so on, the storage and retrieval of files, for example but not limited to data, documents, data tables and so on, the storage keeps on increasing for redundant data thereby wasting computing resources and reducing latency. Thus, instead of storing and retrieving an original file each time by multiple applications frequently over the network, a reference of the file may be shared from a local storage such as cache by accessing it programmatically. This helps end user to open the file in the required format, edit the document, save the document and perform other operations using cache locally by parallel running multiple applications on one or multiple computing systems.

As illustrated in FIG. 4, the system 400 includes users 402 that access external applications 408 via client SSO 406 (Client Single Sign-On) and/or one or more front-end components/interfaces 404 that may be executed on one or more of the computing devices 102-108 to enable receipt of a user request regarding retrieving/storing data/files/documents/data tables and so on. In some examples, the user request may be received through various modalities including, but not limited to, a question input to a chat bot, a request provided through a Graphical User Interface (GUI), an email, and/or the like using web access. In some examples, the user request may be received through token generation via client SSO to access the external applications 408 that may include but not limited to web apps 410, an API 412, AI services 414 and so on.

The user requests may be received on a middleware 416 that processes the request regarding storing or retrieval of file. The middleware 416 includes one or more processors to execute different operations. The processors may include, for example, microprocessors, microcomputers, microcontrollers, digital signal processors, central processing units, state machines, logic circuits, and/or any devices that manipulate data or signals based on operational instructions. Among other capabilities, the processor may fetch and execute computer-readable instructions in a memory operationally coupled with middleware 416 for processing the user request. The one or more processors in the middleware may include but is not limited to perform operations for storing and/or retrieving the files based on user request. The operations may include but not limited to token validation at a client SSO block 406, authorization of the user request at authorization block 418, read/write file information and other metadata details in metadata definitions block 420, searching an API at search API block 422, logging and updating file versions at file versioning block 424, CRUD operations performed at File CRUD operations block 426, search performed at advanced search block 428. The File CRUD operations block 426 discloses four basic functions of a database-Create, Read, Update, and Delete, i.e.-Create function discloses adding new records to the database, Read function discloses retrieving data from the database, Update function discloses modifying existing records in the database. The middleware 416 acts as a bridge between diverse technologies, tools, and databases to integrate them into a single system.

When the file is received for download, the file from middleware 416 may be scanned for viruses at a virus scan block 430 and once verified may write down in a master storage 440. The virus scan block 430 may comprise a message queue block 432 to queue down all inputs received at the virus scan block 430. These files may be stored in a temporary storage at temp storage 434 and scanned through a scanner 436. Thereafter, the files are write down in the master storage 440. The master storage may further store metadata of the files at a metadata store 442 and store files in a file storage 444. The master storage may be electrically coupled to a storage wrapper 438. The storage wrapper 438 may be a component/code to surround and provide an interface to the master storage 440 and works as a medium to allow easier integration and interaction with the wrapped functionality. It may also wrap arbitrary programs thus enabling them to be installed and run in the background, rather than under the direct control of the user.

The ML model 300 may be trained based on the frequency of accessing the files. The trained ML model implements a cache data store 452 (interchangeably referred to as smart cache data store 242) in a smart cache engine 446, by fetching a copy of the frequently accessed files from the master storage 440 and storing a local copy of each of the frequently accessed files into the cache data store 242. Once the frequently accessed files may be stored in the cache data store 452, on receiving a read request for the file by one or more of the applications in the computing devices 102-108, the file may be accessed from the cache data store 452 instead of the master storage 440.

In an example, a scanned file MM is received on the system A. This file MM is required to be accessed by the system B after 24 hours. The ML model stores this file MM into the cache data store locally. This results in faster accessibility of the file MM when stored in the cache data store, as compared to pulling the file MM from the master storage. This helps to observe the pattern in which the file MM is stored, the pattern the file is being used, how many times the file is used, saving it to the cache locally and accordingly the cache is stored into the system to access the files easily.

FIG. 4 further discloses the smart cache engine 446 that includes a Data Request Index Builder 448, an Auto Cache Props 450, the Cache Data Store 452 sand an Auto Refresh Engine 454. The smart cache engine 446 is coupled to the storage wrapper 438 and the master storage 440 for fetching files based on index data and writing updated version of the files back to the master storage once the cache may be overwrite or frequently accessing files may be no more required.

The Data Request Index Builder 448 builds an index data based on data being requested previously. The index data may be a dataset which tells which data may be accessed when and which data may be cached when. For example, if ten files need to be uploaded or ten data tables are required to be accessed, then data indexer gets generated based on historical usage and frequency of application setup. In an example, if we need file for next thirty days in cache, such properties are collected, and an index is created and referred to as basic data index. The data indexer is based on the historical usage or frequency of access of the file.

The Auto cache prop 450 configure application that may automatically cache indexed files. For example, configuring the particular application that checks data index and automatically cache the files that may be required to cached in next 24 hours or 48 hours. Based on the data index, an Auto cache property may be generated towards data set or the file. The set of files when the file may be getting operated, will be tagged with the property called auto cache props. This takes the indexed file and tags the dataset as cache need to be refreshed sequentially based on the property, for example—every twenty-four hours. Therefore, initially the property is created and then automatically its caches the files as per the property in the Cache Data Store 452.

The Auto Refresh Engine 454 in the smart cache engine 446 that stores frequency with which the cache is required to be re-cached/refreshed/overwrite. For example, the auto refresh property is setup as it should get cashed every twenty-four hours. For this purpose, the smart cache engine 446 may automatically refresh the whole cache 252 and store the files into the cache data storage. Moreover, secondly on the basis of auto cache property, the smart cache engine 446 may go and pull the data and keep the data ready in the cache as per the set property.

In an exemplary embodiment, when the files come through the storage wrapper 438, the message queue 432 pipelines store the data temporarily in temp storage 434 and the data index generates automatically based on the historical use of the file. In another example, if a pdf file is required to be accessed in every 24 hours, a data index will be built automatically based on the file's metadata property. The data index will tag the file to refresh after 24 hours. The files are just once copied from metadata store 442 and the file storage 444, that are stored in the cache data store 452 rather than downloading the file again and again from the master storage 440. When a particular time is set to refresh the cache data store (for example 24 hours), the smart cache engine 446 grabs the file from the metadata store 442 and file storage 444 and stores it into the cache data store 452. Once the file is loaded into the cache data store 452, the file should we available in the cache for next 24 hours as per the search properties in the data request index builder 448.

Implementation of the present disclosure generally relates to optimizing computer resources for storage of files. Specifically, the present disclosure is directed to avoid creating and storing redundant files in master storage by creating a local copy in the cache data store, of the files which are used multiple times by multiple applications. Streaming of the files from the cache data store uses lower computer resources. Also, reducing redundant copies of the files across multiple parallel running applications reduce storage of multiple copies, maintains consistency across applications and are easier to find and update. Moreover, the use of cache data store reduce latency regarding file retrieval. Also, the multiple versions of the file are created locally in the neural cache arrays closer to the applications, that easily update the versions of the file in the cache data store and reduces the chances of errors regarding picking wrong version of the file.

FIG. 5 is a flow diagram that presents an example method 500 for accessing files in accordance with implementations of the present disclosure. In some implementations, the method 500 may be executed within the system 400 as described in relation to FIGS. 3 and 4.

At step 502, the data request index builder 448, collects information on access of different files by the different applications running on the computing devices 102-108. The data request index builder 448 maintains an index regarding the frequency of the file access, that the file may have been exercised for the first time, for the second time, or for how many times. The index further records the details regarding a user who is calling the request, the application which raised request to access the file, the region from which the request may be generated, or how long the request took, whether based on the request, the files was successfully downloaded or viewed or accessed. The data index further discloses the types of data, dataset name it is referring to, the backend name, the tables involved, dataset query/code being executed to get this data and but not limited to the server name and the server types along with its parameters. Once the data sets are collected, the prediction model may be built based on index data.

At step 504, the information is normalized within a predetermined range. The normalization is also referred to as preprocessing that includes but is not limited to preprocess the collected data to extract useful features, for example to extract the data or file extension, data or file size, and access frequency of the file. The normalization refers to making the data more precise for training an ML model. For example— if a file needs to be normalized, it is determined that how many times the file is accessed in the frequency of 0 to 1, i.e.-showing how many times the document is being accessed, where I being the highest. Depending on the frequency access of the file, the file is auto-cache.

At step 506, a machine learning model (ML model) 300 may be trained with the normalized information to predict which of the files should be stored in a cache data store 452. In an exemplary representation, it should be appreciated that different normalizations are to determine how many times the file is accessed before, for example when download the file for the first time, the file size being several MBs, takes longer and use multiple network resources. When download the file from cache, it does not use network much therefore the file downloads faster. Similarly, the retrieval size for ingress and egress is very less. Technically, weightage includes that the attributes switch helps to identify the file has to be cached or not cached for normalization.

At step 508, the cache may be implemented by storing predicted files in the cache data store 452. This may refer to monitoring the cache to populate or overwrite the cache.

At step 510, accessing one of the predicted files in the cache data store 452 by at least two of the different applications without making multiple copies of the one of the predicted files. Thus, the applications running on the computing systems 102-108 requests information and perform operations on the file by pulling the file or information from the cache rather than from the metadata store 442 or file store 444. The information of each of the files includes one or more of whether a user or application called the file, what application is calling the file, what geographic region a call for a file is originating from, success or failure to download the file and what is query to used execute data of the file.

The above methodology provides a technical solution to the technical problems of the typical systems. By enabling the Implementations of the present disclosure enable the file in the cache may to be accessed by two different applications without creating copy of file, storage requirements are reduced due to fewer copies, and the problem of multiple inconsistent file copies is eliminated. It helps in faster retrieval of file. Read/write into ingress and egress reduces that makes the system efficient, effective, and economic. The cached location makes the common file easier to locate rather than having to search amongst multiple (and possibly conflicting) file copies. When the cache is location near the applications that use it, the file can be retrieved faster thus reducing retrieval time, power consumption, and network transmission resources.

Implementations of the present disclosed ML model enables computing resources optimization by storing the frequently file locally into cache rather than accessing it each time from the master storage. In contrast, if you register files on multiple networks and multiple storages, it uses more computer network resources which results into higher storage. By storing the files in local cache storage, such as smart cache data store 242 or the cache data store 452, the resources utilized are lower as well as the storage may get reduced, and the system becomes more efficient as the file retrieval gets faster. Also, cashing file into neural/local caches (such as-cache data store 452 or the smart cache data store 242) by using internet rather than dedicated resources on varied cloud storages, the file access become economical and reduce latency. Moreover, database query is complex to access as well as time taking as compared to cache. Therefore, the implementation of the present disclosure is resource efficient and reduce redundancy in the system.

Implementation of the presently disclosed system having the ML model generally relates to optimizing use of computer resources for storage of files. Specifically, the ML model is directed to avoid creating and storing redundant files in master storage by creating a local copy in cache of files which are used multiple times by multiple applications. Streaming of the files from the cache uses lower computer resources. Also, reducing redundant copies of the files across multiple parallel running applications that reduce storage of multiple copies, maintains consistency across applications and are easier to find and updated file.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method comprising:
generating information on access of different files by different computing applications on a master storage based on historical events;
preprocessing the information to determine frequency of the access of each of the different files by the different computing applications during normalizing the information within a predetermined range;

training a machine learning model with the normalized information to predict which of the different files should be stored in a cache, wherein the machine learning model is trained based on at least the determined frequency of the access of each of the different files by the different computing applications;
storing predicted files in the cache based on the predicted files output by the trained machine learning model, wherein the storing comprises:
predicting, using the trained machine learning model, that a particular one of the different files is to be cached; and
storing the particular one of the different files on the cache;
transmitting a reference of one of the stored predicted files to at least two of the different computing applications;
enabling accessing the one of the stored predicted files in the cache by the at least two of the different computing applications, without making multiple copies of the one of the stored predicted files, based on the reference of the one of the stored predicted files, wherein the enabling accessing comprises:
instructing the different computing applications to access the cache for the one of the stored predicted files rather than the master storage; and
updating the cache with updated versions of the predicted files.

2. The method of claim 1, wherein the accessing comprises simultaneously accessing the one of the predicted files in the cache by the at least two of the different computing applications without making the multiple copies of the file, wherein the one of the predicted files in the cache is accessed by the at least two different computing applications by a hyperlink transmitted as the reference.

3. The method of claim 1, wherein the information of each of the different files including name, size, access time, and the frequency of the access.

4. The method of claim 1, wherein the information of each of the different files includes any of:
whether a user or a computing application called a file of the different files;
what computing application is calling the file;
what geographic region a call for the file is originating from;
success or failure to download the file; and
what query is used to execute data of the file.

5. A non-transitory computer readable media storing instructions programmed to cooperate with an electronic computer system to cause the system to perform operations, comprising:
generating information on access of different files by different computing applications on a master storage based on historical events;
preprocessing the information to determine frequency of the access of each of the different files by the different computing applications during normalizing the information within a predetermined range;
training a machine learning model with the normalized information to predict which of the different files should be stored in a cloud located cache, wherein the machine learning model is trained based on at least the determined frequency of the access of each of the different files by the different computing applications;
storing predicted files in the cache based on the predicted files output by the trained machine learning model, wherein storing comprises:

predicting, using the trained machine learning model, that a particular one of the different files is to be cached; and storing the particular one of the different files on the cache;

transmitting a reference of one of the stored predicted files to at least two of the different computing applications;

enabling accessing of the one of the predicted files in the cache by the at least two of the different computing applications, without making multiple copies of the one of the predicted files, based on the reference of the one of the predicted files, wherein the accessing comprises:

instructing the different computing applications to access the cache for the predicted files rather than the master storage; and updating the cache with updated versions of the predicted files based on one or more operations performed by the different computing applications.

6. The non-transitory computer readable media of claim 5, wherein the accessing comprises simultaneously accessing the one of the predicted files in the cache by the at least two of the different computing applications without making the multiple copies of the file.

7. The non-transitory computer readable media of claim 5, wherein the information of each of the different files including name, size, access time, and the frequency of the access.

8. The non-transitory computer readable media of claim 5, wherein the information of each of the different files includes any of:

whether a user or a computing application called a file of the different files;

what computing application is calling the file;

what geographic region a call for the file is originating from;

success or failure to download the file; and what query is used to execute data of the file.

9. A system, comprising:

a non-transitory computer readable memory storing instructions;

a processor communicatively coupled to the non-transitory computer readable memory, configured to:

generate information on access of different computing files by different applications on a master storage based on historical events;

preprocess the information to determine frequency of the access of each of the different files by the different computing applications during normalizing the information within a predetermined range;

train a machine learning model with the normalized information to predict which of the different files should be stored in a cloud located cache, wherein the machine learning model is trained based on at least the determined frequency of the access of each of the different files by the different computing applications;

store predicted files in the cache based on the predicted files output by the trained machine learning model, wherein to store the predicted files, the processor is further configured to:

predict, using the trained machine learning model, that a particular one of the different files is to be cached; and store the particular one of the different files on the cache;

transmitting a reference of one of the stored predicted files to at least two of the different computing applications;

enable accessing the one of the stored predicted files in the cache by the at least two of the different computing applications, without making multiple copies of the one of the stored predicted files, based on the reference of the one of the stored predicted files, wherein to enable accessing, the processor is configured to:

instruct the different computing applications to access the cache for the one of the stored predicted files rather than the master storage; and update the cache with updated versions of the predicted files.

10. The system of claim 9, wherein enabling the accessing comprises enabling simultaneous accessing of the one of the predicted file in the cache by the at least two of the different computing applications without making multiple copies of the file.

11. The system of claim 9, wherein the information of each of the different files including name, size, access time, and the frequency of the access.

\* \* \* \* \*